United States Patent [19]

Konno et al.

[11] 4,276,683
[45] Jul. 7, 1981

[54] METHOD FOR WINDING ELECTRODE FOILS AND SEPARATORS FOR CAPACITOR

[75] Inventors: Toshio Konno, Aichi; Masatoshi Hayakawa, Nagoya, both of Japan

[73] Assignee: CKD Corporation, Komaki, Japan

[21] Appl. No.: 934,596

[22] Filed: Aug. 17, 1978

[30] Foreign Application Priority Data

Oct. 4, 1977 [JP] Japan ............................. 52-119389

[51] Int. Cl.$^3$ ............................................. H01G 4/32
[52] U.S. Cl. .................................. 29/25.42; 242/56.1
[58] Field of Search ............................. 29/25.42, 605; 242/56.1

[56] References Cited

U.S. PATENT DOCUMENTS

| | | | |
|---|---|---|---|
| 3,113,740 | 12/1963 | Hinds | 242/56.1 |
| 3,473,750 | 10/1969 | Bayard, Jr. | 242/56.1 |
| 3,815,188 | 6/1974 | San Pietro | 29/25.42 |
| 4,003,112 | 1/1977 | Miller et al. | 29/25.42 |

Primary Examiner—Carl E. Hall
Attorney, Agent, or Firm—Wenderoth, Lind & Ponack

[57] ABSTRACT

A method and an apparatus for winding electrode foils with lead wires attached thereto at predetermined intervals and separators for a capacitor, in which a plurality of electrode foils and separators are superimposed and wound into a small capacitor. The electrode foils and separators superimposed in sandwiched fashion are connected at the leading ends to a winding shaft and are wound therearound. When one lead wire attached to one electrode foil has reached a position spaced a predetermined distance from the winding position, the winding shaft is stopped to position the lead wire and the one electrode foil is cut at a position spaced a predetermined distance from the one lead wire. Then the winding shaft is started again to wind the superimposed electrode foils and separators and when another lead wire attached to another electrode foil has reached a position spaced a predetermined distance from the said winding position, the winding shaft is stopped again and the lead wire attached to the other electrode foil is positioned, and thereafter the other electrode foil and separators are cut at a position spaced a predetermined distance from the other lead wire.

3 Claims, 17 Drawing Figures

METHOD FOR WINDING ELECTRODE FOILS AND SEPARATORS FOR CAPACITOR

BACKGROUND OF THE INVENTION

The present invention relates to a method for winding electrode foils and separators into a small size capacitor, and more particularly to a method for winding electrode foils in which the relatively short electrode foils and the relatively short insulating papers are wound with a pain of lead wires fixed to the positive and the negative electrode foils respectively being positioned beforehand so as to be precisely opposed to each other.

For example, in a case where short electrode foils several tens of millimeters in length are wound into a small size aluminum electrolytic condenser, it is possible to simplify the apparatus for winding electrode foils and separators by attaching lead wires to the positive and negative electrode foils beforehand at predetermined intervals.

In the manufacture of capacitor elements by superimposing and winding electrode foils and separators or insulating paper, the lead wires for the positive and the negative electrodes must be disposed symmetrically with respect to the center of the capacitor element. An unsymmetrical disposition of the lead wires is undesirable for the following reasons:

(a) The gap between the positive and the negative electrode foils is uneven or unduly large, thereby making the electrical properties of the capacitor element unstable.

(b) The gap between the electrode foil and the separator or insulating paper is unduly large, thereby causing displacement between the electrode foil and the separator and causing a short-circuit.

(c) Subsequent steps of the automatic capacitor assembly operation, such as insertion of rubber packings, are made difficult or unsmooth, leading sometimes to damage of the electrode foils.

Although the above-described problems are caused by the unsymmetrical arrangement of the lead wires, conventional winding methods for small capacitors have not precisely positioned the lead wires on and cut the electrode foils at the precise positions spaced predetermined distances from the lead wires and, accordingly, it has been impossible to wind the foils with the lead wires in a precisely opposed relation. In the conventional methods including, for example, the invention disclosed in Japanese Patent Publication No. 5508/68 entitled "Automatic Capacitor Element Winding Apparatus," the principle interest was only in achieving a uniform winding length of the electrode foils, not in obtaining a uniform position of lead wires attached to the electrode foils. In fact, in the automatic winding apparatus according to the above-identified Japanese Patent Publication, the electrode foils are cut without stopping their movement and it is impossible to cut them with high dimensional accuracy and moreover it is very difficult to position the leading wires accurately.

SUMMARY OF THE INVENTION

Accordingly, a primary object of the present invention is to provide a method for winding electrode foils and separators for a capacitor, in which the foils and the separators are wound into a capacitor with a pair of lead wires arranged so that they are always symmetrical.

A further object of the present invention is to provide a method for winding electrode foils and separators, in which the lengths of a plurality of electrode foils from the leading ends thereof to the first lead wires are different from each other in a predetermined relation so that when the electrode foils are wound the leading wires are arranged symmetrically with respect to the center of the capacitor element.

A still further object of the present invention is to provide a method for winding electrode foils and separators, in which the lead wires fixed to the electrode foils are detected at positions spaced a predetermined distance from the winding position and the electrode foils are cut at another predetermined distance so that the length from the leading ends of the electrode foils to the first lead wire is equal to a predetermined length.

The method for winding electrode foils and separators into a small size capacitor according to the present invention wherein a plurality of electrode foils to which lead wires are fixed at equal distances and a plurality of separators are superimposed, are connected at the leading end to a winding shaft and are wound thereby; the method is characterized in that when one of the lead wires attached to one of the electrode foils has reached a position spaced a predetermined distance from the winding position, at which a lead wire detecting device of the photoelectric tube type is provided, the winding shaft is stopped and positioned and thereafter said one of the electrode foils is cut; then the winding shaft is started again and when the other of the lead wires fixed to the other of the electrode foils has reached a position spaced a predetermined distance from said winding position, at which a further lead wire detecting device of the photoelectric tube type is provided, said winding shaft is stopped for positioning said other lead wire, and thereafter said other of the electrode foils and separators are cut.

The apparatus for carrying out the method of winding electrode foils and separators for a capacitor according to the present invention is characterized in that it comprises:

(1) lead wire attaching devices for attaching lead wires to the electrode foils, respectively, at a predetermined distance;

(2) first and second lead wire detecting devices spaced predetermined distances, respectively, from a winding shaft, for detecting the lead wires attached to said electrode foils, respectively;

(3) a first cutter spaced a predetermined distance from said first lead wire detecting device, for cutting one of the electrode foils;

(4) a second cutter spaced a predetermined distance from said second lead wire detecting device, for cutting the other of the electrode foils; and (5) a feed device for advancing a predetermined length of said one of the electrode foils toward said winding shaft; and said apparatus is further characterized in that when the lead wire attached to said one of the electrode foils is detected by said first lead wire detecting device said winding shaft is stopped and said one of the electrode foils is cut by said first cutter, and when the lead wire attached to said other of the electrode foils is detected by said second lead wire detecting device said winding shaft is stopped and said other of the electrode foils and the separators are cut by said second cutter.

BRIEF DESCRIPTION OF THE DRAWINGS

The invention will be better understood from the following description taken in connection with the accompanying drawings in which.

DETAILED DESCRIPTION OF THE PREFERRED EMBODIMENTS

With reference to the drawings, several examples and embodiments of the method according to the present invention and apparatus for carrying it out will be described in detail.

Figure 1A:
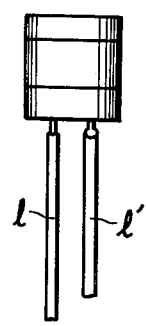
FIG. 1A is a side elevation of a capacitor element wound by the method according to the present invention.
Figure 1B:
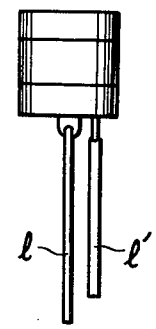
FIG. 1B is a side elevation of a capacitor element wound by the conventional method.
Figure 1C:
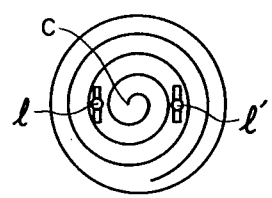
FIG. 1C is a lower end view of the capacitor element of FIG. 1A.
Figure 1D:
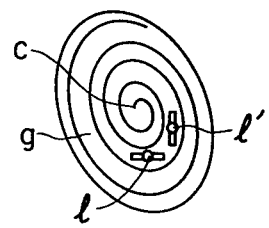
FIG. 1D is a lower end view of the capacitor element of FIG. 1B.

Referring now to FIGS. 1A to 1D, in the capacitor element wound by the method according to the present invention, as shown in FIGS. 1A and 1C, the lead wires 1 and 1' are arranged symmetrically with respect to the center O of the capacitor element. In contrast to this, in the capacitor element wound by the conventional method, as shown in FIGS. 1B and 1D, the lead wires 1 and 1' tend to be arranged unsymetrically.

Figure 2:
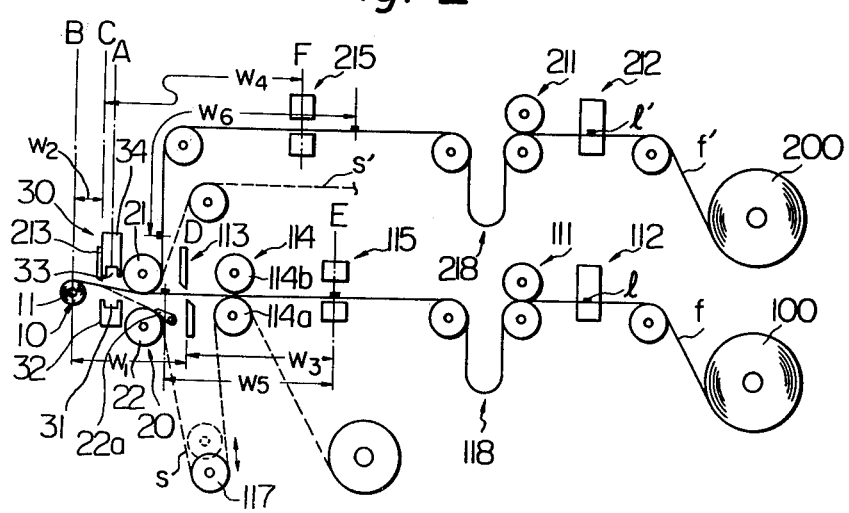
FIG. 2 is a schematic illustration of the first embodiment of the apparatus according to the present invention.

In FIG. 2 schematically illustrating the first embodiment of the apparatus for carrying out the method according to the present invention, reference numerals 100 and 200 denote rolls of positive and negative electrode foils f and f', respectively. Numerals 111 and 211 denote pay-out devices of known construction for intermittently paying out lengths of the electrode foils f and f' equal to the desired winding length from the rolls 100 and 200, respectively. Numerals 112 and 212 denote lead wire attaching devices for attaching lead wires 1 and 1' to the electrode foils f and f', respectively.

Reference numeral 10 denotes a winding shaft having a groove 11 therein into which the electrode foils f and f' and separators S and S' are inserted. Numeral 20 denotes a guide device comprising fixed guide rollers 21 and 22 disposed rotatably at positions spaced a predetermined distance from the winding shaft 10 and a separator detent 22a, for guiding the electrode foils f and f' and the separators S and S' into the groove 11 of the winding shaft 10.

Figure 3:
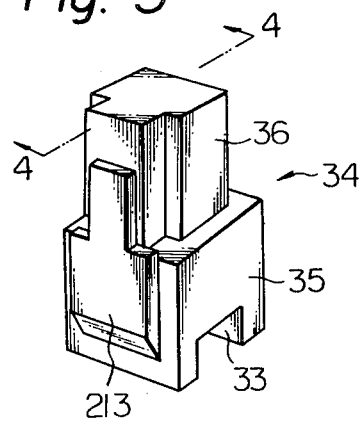
FIG. 3 is a perspective view of a pull-out chuck.
Figure 4:
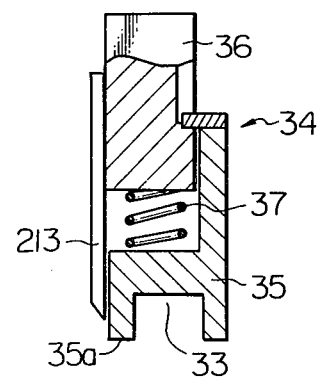
FIG. 4 is a sectional view taken along the line 4—4 of FIG. 3.

A pull-out chuck 30 is provided at position A between the winding shaft 10 and the guide device 20. The pull-out chuck 30 comprises a lower jaw 32 having a groove 31 in the upper face thereof and an upper jaw 34 having a groove 33 in the lower face thereof. The upper jaw 34 comprises, as shown in FIGS. 3 and 4, a lower part 35 having the groove 33 therein and an upper part 36 which is movable with respect to the lower part 35 and normally upwardly biased by a spring 37. The upper part 36 has a cutter 213 fixed on the face thereof toward the winding shaft. The cutter 213 is spaced a distance $W_2$ from a winding position B (the position of the axis of the winding shaft 10). The cutter 213 is adapted to retract the cutting edge thereof behind a face 35a of the lower part 35 when the upper and the lower jaws are separated from each other and to cut the electrode foil f' and the separators S and S' when the upper and the lower jaws come sufficiently close together to urge and hold the electrode foils and the separators therebetween and thereafter the upper part 36 is further depressed. The pull-out chuck 30, after holding the electrode foils and the separators therebetween at a position A, moves to the winding position B (during which the winding shaft is kept retracted in the direction perpendicular to the drawing in FIG. 2), and causes the electrode foils and the separators to be inserted into the groove 11 of the winding shaft 10 when the shaft 10 is thrust out.

Figure 2A:
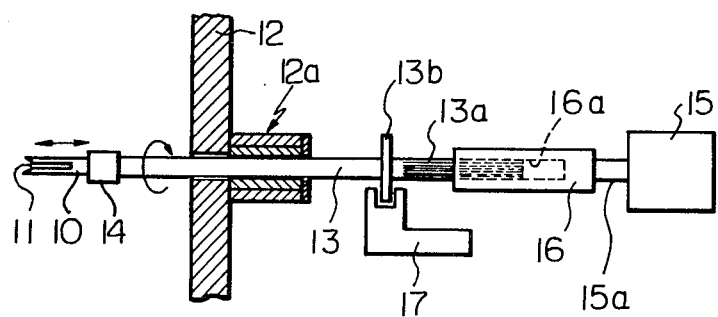
FIG. 2A is a schematic side view of means for rotating or axially moving the winding shaft.

While means for rotating or axially moving the winding shaft during winding the electrode foils and separators at one position as shown in FIG. 2 is in itself known, it is schematically shown in FIG. 2A.

The winding shaft 10 is attached by a chuck 14 of known construction to an end of a rotary shaft 13 extending through a hole of a panel 12 and mounted rotatably in the panel in a bearing 12a. At the rearward end of the rotary shaft 13 is an outer spline 13a which is engaged in an inner spline 16a of a sleeve 16 mounted on a shaft 15a of a pulse motor 15. On the rotary shaft 13 is a flange 13b which is in engagement with a lever 17 moved axially by a known mechanism. Accordingly, the winding shaft 10 is rotated by the pulse motor 15 and moved axially by the lever 17.

A cutter 113 for cutting the electrode foil f is disposed on the right (in FIG. 2) of the guide device 20 at a position spaced a distance $W_1$ from the winding position. On the upstream side (on the right in FIG. 2) of the cutter 113 is disposed a pay-out device 114 for the electrode foil f. The pay-out device 114 comprises a feed roller 114a rotatable at a fixed position and a pressure roller 114b rotatable and movable toward and away from the feed roller 114a. In the pay-out device 114, when a tension roller 117 is moved downward while pressing the separator S and the electrode foil f between the feed roller 114a and the pressure roller 114b by urging said pressure roller 114b against said feed roller 114a, the separator S is paid out and thereby a length of the electrode foil f is paid out equal to the length of the separator S by frictional force between said electrode foil f and separator S. When the pressure roller 114b is raised to end the pressure on the electrode foil f and separator S, the electrode foil f is free from friction.

A lead wire detecting device 115 for detecting the lead wire attached to the electrode foil f by a photoelectric tube is provided at a position E spaced a predetermined distance $W_3$ (measured along the path of the foil f) from the position D of the cutter 113. A lead wire detecting device 215 for detecting the lead wire attached to the electrode foil f' is provided at a position F spaced a predetermined distance $W_4$ (measured along the path of the foil f') from the position C of the cutter 213.

The distance $W_3$ is smaller than the distance $W_5$ between the lead wires fixed onto the electrode foil f so that when a lead wire l is detected by a lead wire detecting device 115 and the electrode foil f is cut by the cutter 113, the detected lead wire is the first lead wire upstream from the cutting position. The distance $W_4$ is larger than the distance $W_6$ between the lead wires l' fixed onto the electrode foil f' and less than $2W_6$ so that when the lead wire l' is detected by the lead wire detecting device 215 and the electrode foil f' is cut by the cutter 213, the detected lead wire is the second lead wire upstream from the cutting position. Since this is related to the space in which the lead wire detecting device is provided, the device may be adapted to detect the first lead wire or the third or greater lead wire. The distances $W_3$ and $W_4-W_6$ are predetermined experimentally so that when the electrode foils f and f' are wound with the leading end of the foil f somewhat behind the leading end of the foil f' and with the foil f wound inside the foil f', the lead wires l and l' are arranged symmetrically as shown in FIGS. 1A and 1C.

Figure 5:
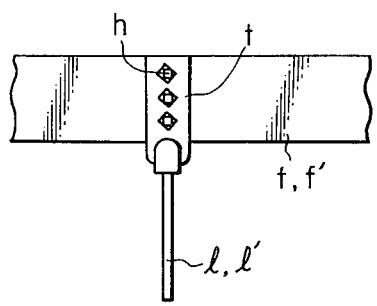
FIG. 5 is an illustration of the attachment of the leading wire to the electrode foil.

The lead wire detecting devices 115 and 215 may be a known photoelectric tube type for detecting connecting stitch holes h formed in tabs t of the lead wires (see FIG. 5).

The lead wire attaching devices may be switching machines of known construction for thrusting a needle or a pin through the superimposed thin tab which is attached to the lead wire and the electrode foil and folding the burr formed thereby so as to join the foil and the tab. Accordingly, no further description of the lead wire attaching devices will be necessary.

The operation of the apparatus shown in FIG. 2 will now be described referring to FIGS. 6A to 6G.

The lead wires l are fixed by the lead wire attaching device 112 with a distance $W_5$ therebetween to the electrode foil f intermittently pulled out from the roll 100 by the pay-out device 111. Likewise, the lead wires l' are fixed by the lead wire attaching device 212 with a distance $W_6$ therebetween to the electrode foil f' intermittently pulled out from the roll 200 by the pay-out device 211. The distance $W_6$ is larger than the distance $W_5$ since the foil f' is always wound outside of the foil f and, accordingly, will have a greater circumferential length and since the leading and the trailing ends of the foil f are inside the leading and the trailing ends of the foil f'.

Figure 6A:
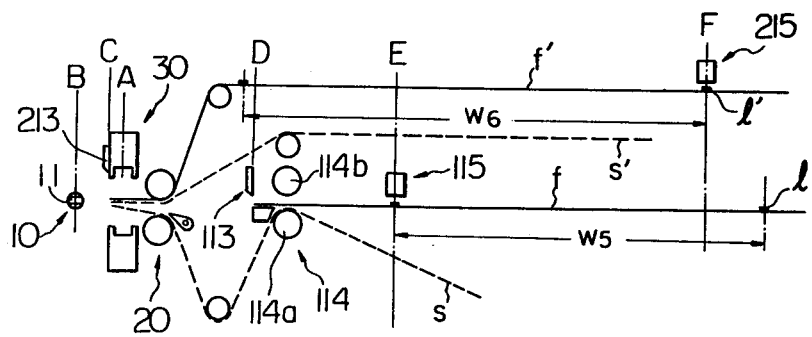
FIGS. 6A to 6G are schematic illustrations of the sequential steps of operation of the apparatus of FIG. 2.
Figure 6B:
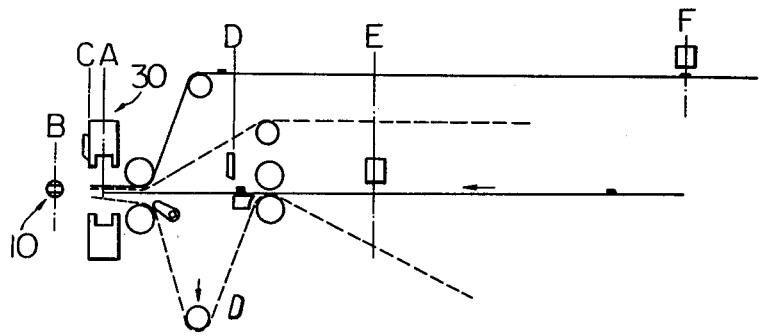

The electrode foil f with the lead wires l attached thereto is advanced along the predetermined path, and when the first lead wire l has reached the position E at which the lead wire detecting device of the photoelectric tube type is provided, rotation of the winding shaft 10 is stopped to position the lead wire l at this position, and thereafter the cutter 113 is operated to cut the leading end (left of the cutter in the drawing) of the electrode foil f. Likewise, the electrode foil f' with the leading wires l' attached thereto is advanced along the predetermined passage, and when the second leading wire l' has reached the position F the cutter 213 is operated to cut the leading ends of the electrode foil f' and the separators S and S'. At this time, accordingly, the electrode foils f and f' and the separators S and S' are in the positions shown in FIG. 6A. In this condition, when the pressure roller 114b of the pay-out device 114 descends to press the separator S and the electrode foil f, the tension roller 117 is moved downward to advance the foil f forward (to the left in the drawing). When the leading end of the electrode foil f' reaches the position A somewhat behind the position C as shown in FIG. 6B, the downward movement of the tension roller 117 stops and the pressure roller 114b begins to ascend. The amount of feed of the foil f is determined by the number of rotation of the feed roller 114a, and the leading end of the foil f need not be exactly at the position A. However, the leading end of the foil f is somewhat behind the leading end of the foil f' so as to prevent conduction between said two foils.

Figure 6C:
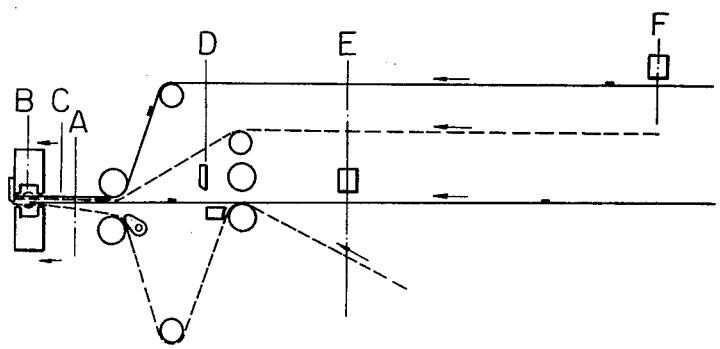

When the feed of the electrode foil f is completed, the upper and the lower jaws 34 and 32 of the pull-out chuck 30 are moved together to hold therebetween the foils f and f' and the separators S and S', and are then moved to the position B as shown in FIG. 6C to pull out the leading ends of the foils and the separators. At this time, the winding shaft 10 is retracted in the direction perpendicular to the drawing from the path of the chuck 30. When the pull-out chuck 30 has reached the position B, the winding shaft is thrust forward to receive the foils and the separators in the groove thereof.

Figure 6D:
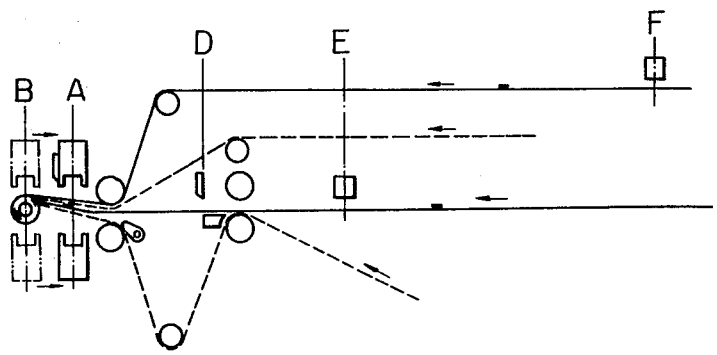

Then, the upper and the lower jaws 34 and 32 of the pull-out chuck 30 are moved apart and the winding shaft 10 is rotated to wind the foils and the separators thereabout and the pull-out chuck returns to its original position as shown in FIG. 6D.

Figure 6E:
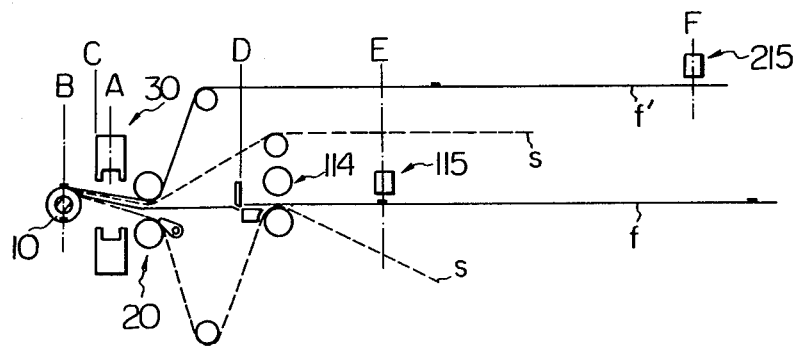

Then the electrode foils and the separators are wound until the lead wire l attached to the foil f has reached the position E shown in FIG. 6E, and then the lead wire detecting device 115 detects the lead wire, stops the rotation of the winding shaft 10 and operates the cutter 113 to cut the electrode foil f.

Figure 6F:
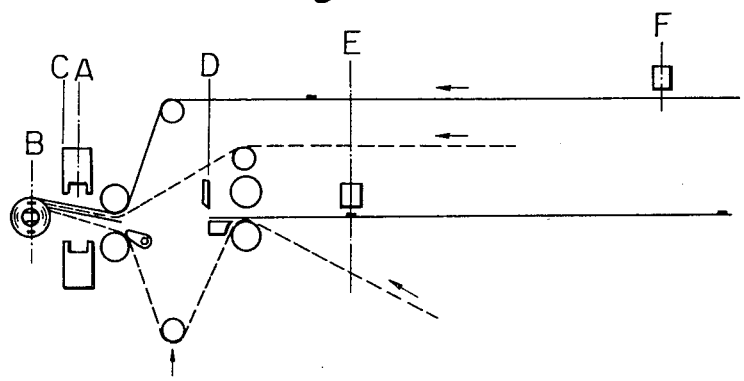
Figure 6G:
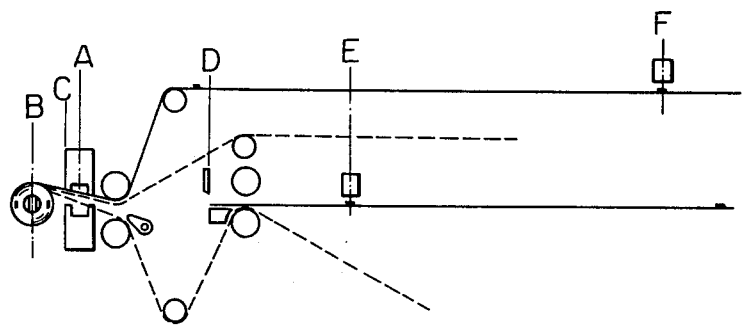

After the electrode foil f has been cut the winding shaft 10 begins rotation to wind the foil f cut at the trailing end, the uncut foil f', and the separators S and S' as shown in FIG. 6F. When predetermined amounts of the foil f' and the separators have been wound and the next lead wire l' attached to the foil f' has reached the position F, the lead wire detecting device 215 detects the lead wire, stops the rotation of the winding shaft 10, and causes the upper and the lower jaws of the pull-out chuck 30 to be moved together to cut the foil f' and the separators S and S' (see FIG. 6G) and assumes the position shown in FIG. 6A. At this time, the trailing end of the foil f is spaced from the trailing ends of the foil f' and the separators S and S' by the desired length determined by the difference between said distances $W_3$ and $W_4-W_6$.

The above-described operations are repeated to wind the electrode foils f and f' and the separators.

Denoted by reference numeral 117 is a tension roller for the separator S and, denoted by numerals 118 and 218 are loop devices for the foils f and f', respectively.

Figure 7:
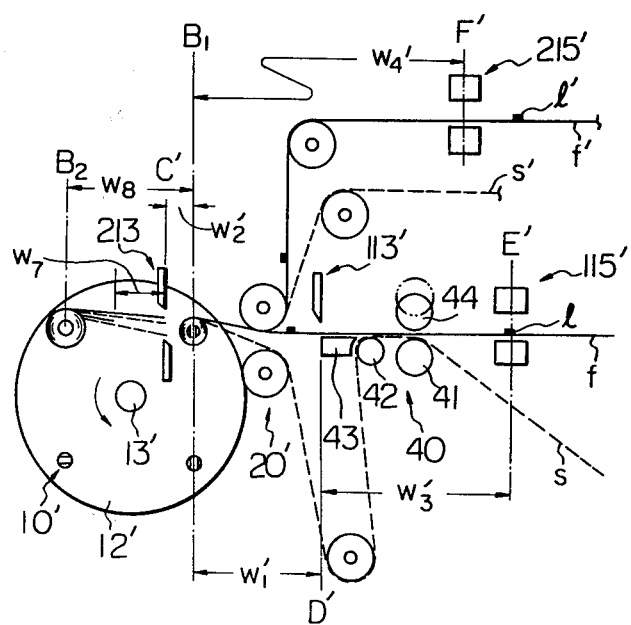
FIG. 7 is a schematic illustration of the second embodiment of the apparatus according to the present invention.

FIG. 7 shows a second embodiment of the present invention, which is related in part to the invention titled "Automatic Capacitor Element Winding Apparatus" disclosed by Japanese patent application No. 49656/76 by the present applicant.

In FIG. 7, reference numeral 12' denotes a turntable rotated 90° at a time by a shaft 13' and provided with four retractable winding shafts 10' which are spaced the same angular distance from one another. The turntable 12' is so constructed that a winding shaft initially at the first winding position $B_1$ will move to a second winding position $B_2$ when the turntable 12' is rotated 90° in the counterclockwise direction. A cutter 213' for cutting the electrode foil f' and the separators is disposed at a position C' between the position $B_1$ and $B_2$ but closer to the position $B_1$ than the position $B_2$.

A feed device 40 is disposed on the right of a cutter 113' for the electrode foil f. The feed device 40 comprises a lower roller 41, a separator 42, a separator block 43, and a pressure roller 44 for pressing the separators and the foil f against the lower roller 41. The lower roller 41 and the separator roller 42 are supported rotatably at the predetermined positions, and the pressure roller 44 is movable away from and toward the lower roller 41. The feed device is constructed so as, when the foil f has been cut by the cutter 113' and the turntable is rotated 90° counterclockwise, to press the separator S and the foil f against the lower roller 41 with the pressure roller 44 and to advance the foil f together with the separator a predetermined distance (until the leading end thereof reaches near the position $B_1$) making use of the fact that the separator S is pulled out by the movement of the winding shaft from the position $B_1$ to the position $B_2$ caused by said counterclockwise rotation of the turntable.

The winding mechanism in which a plurality of the winding shafts are disposed on the turntable as shown in FIG. 7 can, in practice, have a construction in which a plurality of arrangements each comprising, as shown in FIG. 2A, a winding shaft, a pulse motor, a lever and the like are disposed on the turntable and spaced equally from one another along a circumference having the center of the turntable as its center, so that the arrangements themselves are revolved intermittently with the turntable.

In the second embodiment shown in FIG. 7, first of all, the leading end of the foil f' (in which the distance between the leading end and the second lead wire l' is the distance $W_4'$) is brought to the same position as the leading ends of the separators S and S', the foils f and f' and the separators S and S' are inserted into the groove of the winding shaft 10' at the position $B_1$ with the leading end of the foil f(in which the distance between the leading end and the first lead wire l is the distance $W_3'$) somewhat behind the leading ends of the others, and the winding shaft is rotated to wind the foils and the separators. Then, when the lead wire l has reached the position E', the lead wire detecting device 115' detects the lead wire, stops the rotation of the winding shaft, and operates the cutter 113' to cut the foil f.

After the foil f has been cut, the winding shaft begins rotation again at the position $B_1$ to wind the foil f, the uncut foil f', and the separators S and S'. When the lead wire l' attached to the foil f' has reached the position F', the lead wire detecting device detects the lead wire and stops the rotation of the winding shaft. At this time, the trailing end of the foil f has been wound a distance $W_7$ (approximately two thirds the distance $W_8$ between the positions $B_1$ and $B_2$) from the position D'.

When the winding shaft is stopped, the pressure roller 44 of the feed device 40 presses the separator S and the foil f against the lower roller, and the turntable 12' is rotated 90°. Accordingly, the winding shaft which was at the position $B_1$ moves to the position $B_2$, and the foil f' and the separators S and S' are pulled out by the distance $W_8$. At the same time, the foil f is advanced forward (in the drawing, to the left) with a delay of $W_7$ by the operation of the feed device 40, and the leading end of the foil f reaches the position $B_1$. The winding shaft which has just reached the position $B_1$ is retracted from the surface of the turntable.

After the rotation of the turntable has been stopped, the winding shaft at the position $B_1$ is thrust forward to receive the foils and the separators in the groove thereof, and the cutter 213' is operated to cut the foil f' and the separators S and S'.

Then, a new winding operation is carried out at the position $B_1$ and the rest of the winding is carried out at the position $B_2$.

Thus, the above-described operations are repeated to continue the winding.

As will be obvious from the foregoing explanation, in the winding method according to the present invention, since it is possible to detect the position of the lead wire each time a single capacitor element is wound and to correct the amount of feed of the electrode foil to thereby prevent accumulation of error of the feed of the electrode foil and to always keep the distance between the lead wire and the leading end of the electrode foil at a predetermined value, the present invention provides the advantages that the pair of the lead wires are always arranged at symmetrical positions with respect to the center of the capacitor element, the length of the positive and the negative electrode foils is maintained to a predetermined value, and the performance of the capacitor element is considerably increased.

While we have shown and described specific embodiments of the present invention, it will be understood that these embodiments are merely for the purpose of illustration and description and that various other forms may be devised within the scope of the present invention as defined in the appended claims.

What is claimed is:

1. A method for winding electrode foils and separators into a small size capacitor, comprising:

placing a plurality of first lead wires on a first electrode foil at first predetermined intervals and placing a plurality of second lead wires on a second electrode foil at second predetermined intervals greater than the first intervals, said intervals being according to the desired capacitance of the capacitor;

superimposing separators and the first and second foils;

engaging the leading end of said superimposed electrode foils and separators with a winding shaft and thereafter rotating said winding shaft for starting winding of the foils and separators;

stopping rotation of said winding shaft when one of the first lead wires attached to said first electrode foils at a position spaced a first predetermined distance along the wound foils and separators from the leading end is at a first radial position relative to said leading end and then cutting said first electrode foil at a position spaced a second predetermined distance from said one lead wire, said first and second predetermined distances together equalling said first interval;

again rotating said winding shaft to further wind said superimposed electrode foils and separators;

again stopping rotation of said winding shaft when a second lead wire attached to said second electrode foil at a position spaced a third predetermined distance along the wound foils and separators from the leading end is at a second radial position relative to the leading end and which second radial position is diametrically opposite the radial position of said first electrode on said first foil with respect to the center of the capacitor, and cutting said second electrode foil and the separators at a position spaced a fourth predetermined distance from said second lead wire, said third and fourth predetermined distances together equalling said second interval; and again rotating said winding shaft to wind the trailing end of said second electrode foil and the separators into a finished capacitor.

2. A method according to claim 1, in which said winding shaft is kept in a single position during the winding of the entire capacitor.

3. A method according to claim 1, in which the winding shaft is positioned in a first winding position while the electrode foils and the separators are wound up to the time of cutting of the first electrode foil.

* * * * *